United States Patent [19]
Anderson et al.

[11] 4,054,767

[45] Oct. 18, 1977

[54] SWITCH TERMINAL ASSEMBLY HAVING STRIP TERMINAL AND MOUNTING MEMBER ADAPTED TO GROUND DYNAMOELECTRIC MACHINE CASING ON SIMILAR CONDUCTIVE SURFACE

[75] Inventors: Wesley K. Anderson, DeKalb; Willard H. Stanley, Sterling, both of Ill.

[73] Assignee: General Electric Company, Fort Wayne, Ind.

[21] Appl. No.: 600,880

[22] Filed: July 31, 1975

[51] Int. Cl.² .................. H01H 9/12; H01R 3/02; H02K 11/00; H05K 5/02
[52] U.S. Cl. .................... 200/293; 174/51; 200/80 R; 200/303; 310/68 R; 339/14 R
[58] Field of Search .............. 200/80 R, 303, 293, 200/302; 339/13, 14, 156, 125 R, 263, 268, 14 R, 14 L; 174/51; 318/221; 310/68 R, 68 B

[56] References Cited

U.S. PATENT DOCUMENTS

| 2,249,618 | 7/1941 | Perkins | 339/195 |
|---|---|---|---|
| 2,305,093 | 12/1942 | Leflar et al. | 200/80 |
| 2,603,732 | 7/1952 | Hinman | 200/164 |
| 2,686,297 | 8/1954 | Hutt | 339/14 |
| 2,710,949 | 6/1955 | Happe et al. | 339/258 |
| 2,792,561 | 5/1957 | Cohen | 339/14 R X |
| 3,293,388 | 12/1966 | Slonneger | 200/80 R X |
| 3,313,905 | 4/1967 | Zagorski | 200/303 |
| 3,358,261 | 12/1967 | Gaines et al. | 339/14 |
| 3,381,197 | 4/1968 | Waters et al. | 318/221 |
| 3,440,592 | 4/1969 | Zelle | 339/14 |
| 3,806,856 | 4/1974 | Virani et al. | 339/14 R |

*Primary Examiner*—James R. Scott
*Attorney, Agent, or Firm*—Joseph E. Papin

[57] ABSTRACT

A switch and terminal assembly adapted to be mounted to a structural component of a dynamoelectric machine by an electrical conductive mounting member. The assembly has a casing, and receiving means is provided through the casing for accommodating the mounting member. A grounding device is disposed in the casing for connecting the dynamoelectric machine to ground, and the grounding device includes means associated with the receiving means for engagement with the mounting means upon the mounting thereby of the assembly to the dynamoelectric machine structural component.

42 Claims, 9 Drawing Figures

SWITCH TERMINAL ASSEMBLY HAVING STRIP TERMINAL AND MOUNTING MEMBER ADAPTED TO GROUND DYNAMOELECTRIC MACHINE CASING ON SIMILAR CONDUCTIVE SURFACE

BACKGROUND OF THE INVENTION

This invention relates generally to electrical control devices and in particular to a switch and terminal assembly for use with a dynamoelectric machine a method of manufacturing a switch and terminal assembly.

In the past, various types of switch and terminal assemblies have been mounted to a dynamoelectric machine externally thereof, and such switch and terminal assemblies were operable generally to at least selectively control the winding circuitry of the dynamoelectric machine. In some instances, other auxiliary circuits were connected through these past switch and terminal assemblies and selectively controlled thereby. One such past switch and terminal assembly is disclosed in U.S. Pat. No. 3,313,905 issued to W. A. Zagorski and in U.S. Pat. No. 3,381,197 issued to J. L. Waters et al. Other types of such past switch and terminal assemblies for controlling the winding circuitry of a dynamoelectric machine where mounted internally thereof on terminal boards or the like, as shown in U.S. Pat. No. 2,305,093 issued to J. Leflar et al. Still another type of such past electrical switches were generally totally enclosed and mounted interiorly of the dynamoelectric machine as illustrated in U.S. Pat. No. 2,603,732 issued to M. B. Hinman.

It is desirable, if not necessary in some dynamo-electric machine or electric motor applications, to effect grounding of the dynamoelectric machine, and various and sundry grounding arrangements have been utilized in the past. For instance, a lead-in metallic conduit has been connected in ground circuit relation with a dynamoelectric machine or, in some instances, a conduit or terminal box therefor; however, at least one of the more apparent disadvantages or undesirable features of this particular grounding arrangement is believed to involve the economics of providing such conduit boxes and metallic lead-in conduits. In another of such past grounding arrangements, a ground wire was run through the lead-in metallic conduit for connection with a component of the dynamoelectric machine, and it is belived that at least one of the disadvantageous or undesirable features of this particular grounding arrangement is generally the same as that discussed above. In some of the resiliently mounted electric motors, another past grounding arrangement included a grounding strap connected between a housing part of the motor and a base therefor with such grounding strap extending across a resilient mount or ring seating such housing part on such base. At least one of the disadvantageous features of this particular past grounding arrangement is believed to be the difficulty in mounting such a grounding strap at least on a production line basis. Of course, there may be many other grounding arrangements in the prior art.

Also in the past switch and terminal assemblies mounted to dynamoelectric machines for controlling at least the winding circuitry thereof, the terminals of such past electrical switches had connector sections or ends externally of the switch casing. These terminal connector sections were adapted to receive a sleeve or slip-on type quick disconnect or fitting which were provided on the ends of leads for connection in circuit with the electrical switch. In some of the past electrical switches, these terminals were aligned generally in row or tier formation at the opposite ends of the switch, and the terminals were provided with either a single connector section or dual, side-by-side connector sections which were also disposed in aligned row or tier formation, as previously mentioned. At least one of the disadvantageous or undesirable features of such past switch and terminal assemblies was that in some applications as many as eight to twelve individual leads were connected with the various switch terminals which was, of course, time consuming on a production line basis as well as confusing in the event of repair or replacement in the aftermarket. Another disadvantageous or undesirable feature of such past switch and terminal assembly is believed to be that the terminal connector sections were so closely spaced with respect to each other difficulty was encountered when the quick disconnects of the leads were assembled to the terminal connector sections.

SUMMARY OF THE INVENTION

Among the several objects of the invention may be noted the provision of a switch and terminal assembly adapted to be mounted to a dynamoelectric machine a method of manufacturing a switch and terminal assembly which overcomes the disadvantageous or undesirable features discussed hereinabove, as well as others, with respect to the prior art; the provision of such switch and terminal, such manufacturing method assembly which automatically, provides a ground circuit for the dynamo-electric machine upon the mounting thereto of the switch and terminal assembly; the provision of such switch and terminal assembly, such manufacturing method wherein a grounding device in such switch and terminal assembly is adapted for coupling in ground circuit relation with means for securing the switch and terminal assembly to the dynamoelectric machine; the provision of such switch and terminal assembly, such manufacturing method wherein the electrical connector sections of some of the terminals are off-set and dissimilar from each other and disposed in row formation with each other, the provision of such switch and terminal assembly such manufacturing method in which at least some of the switch terminal connector sections are adapted to receive a multiple connector assembly having leads predeterminately arranged for connection in circuit relation with the switch and terminal assembly; the provision of such switch and terminal assembly having a plurality of terminals with some including a pair of dissimilarly shaped electrical connector sections disposed generally in side-by-side relation and in row formation with each other and with the terminal plurality including a ground terminal having only a single electrical connector section with a shape generally similar to one of the electrical connector section pairs and disposed in the row formation therewith; and the provision of such switch and terminal assembly, such manufacturing method which is simplistic in nature or design, economically manufactured, and easily assembled or connected. These as well as other objects and features of the present invention will be in part apparent and in part pointed out hereinafter.

In general and in one form of the invention, a switch and terminal assembly is adapted to be mounted to a structural component of a dynamoelectric machine by an electrical conductive mounting member. The switch and terminal assembly has a casing, and receiving means is provided in the casing for accommodating the mounting member. A grounding device is disposed in the casing for connecting the dynamoelectric machine with ground, and the grounding device includes means associated with the receiving means for engagement with the mounting member upon the mounting thereby of the electrical switch to the dynamoelectric machine structural component.

Also in general and in one form of the invention, a switch and terminal assembly is adapted to be mounted to a structural component of a dynamoelectric machine.

The assembly has a casing, and a pair of plurality of terminals are mounted to the casing. Each of the terminal pluralities include two terminals respectively having a pair of dissimilarly shaped electrical connection sections disposed generally in side-by-side relation and in row formation exteriorly of the casing. Receiving means is provided in the casing for accommodating the mounting member, and a grounding device is disposed at least in part in the receiving means for grounding engagement with the mounting member upon the mounting thereby of the assembly to the dynamoelectric machine structural component. The grounding device includes only a single electrical connector section extending exteriorly of the casing so as to be included in one of the terminal pluralities and adapted for connection with a ground. The single electrical connector section of the grounding device has a shape generally similar to that of one of the electrical connector sections of the two terminals in the one terminal plurality and is disposed in the row formation therewith. Further in general, a switch and terminal assembly in one form of the invention has a casing with a pair of opposite walls, and a switch means accommodating chamber is provided in the casing. A plurality of terminals is disposed in one of the opposite walls, and at least one terminal of the terminal plurality has a pair of dissimilarly shaped electrical connector sections disposed generally in side-by-side relation exteriorly of said one opposite wall. At least another terminal of the terminal plurality has only a single electrical connector section exteriorly of the one opposite wall with a shape generally similar to that of one of the electrical connector sections of the at least one terminal and arranged generally in row formation with the one electrical connector section. At least one terminal means is disposed in the other of the opposite walls, and the at least one terminal of the terminal plurality and the at least one terminal means are switch terminals and respectively support within the chamber switch means adapted for selective engagement with each other. The ground terminal also includes a portion disposed in the opening for connection with the mounting member to effect a ground circuit therethrough to the dynamoelectric machine when the mounting member is disposed in the opening and coupled with the dynamo-electric machine so as to mount the assembly thereto.

BRIEF DESCRIPTION OF THE DRAWINGS

Corresponding reference characters indicate corresponding parts throughout the several views of the drawings.

The exemplifications set out herein illustrate preferred embodiments of the invention in one form thereof, and such exemplifications are not to be construed as limiting in any manner the scope of the invention.

DETAILED DESCRIPTION OF THE PREFERRED EMBODIMENTS

Figure 1:
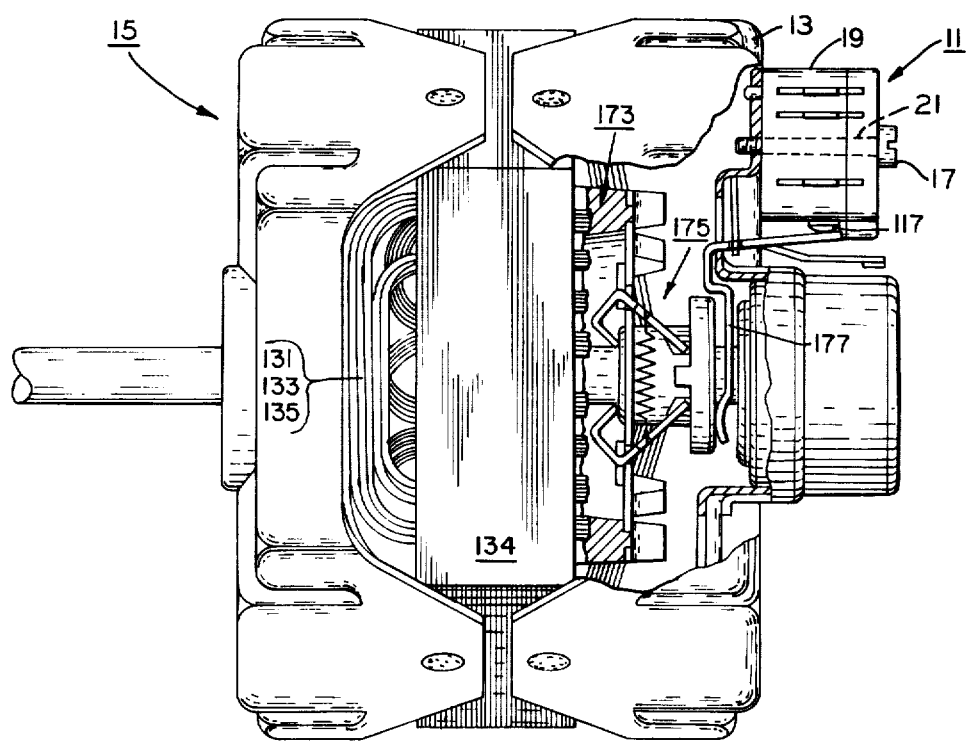
FIG. 1 is a side elevational view of a dynamoelectric machine having a switch and terminal assembly in one form of the invention mounted thereto a method of manufacturing a switch and terminal assembly.
Figure 2:
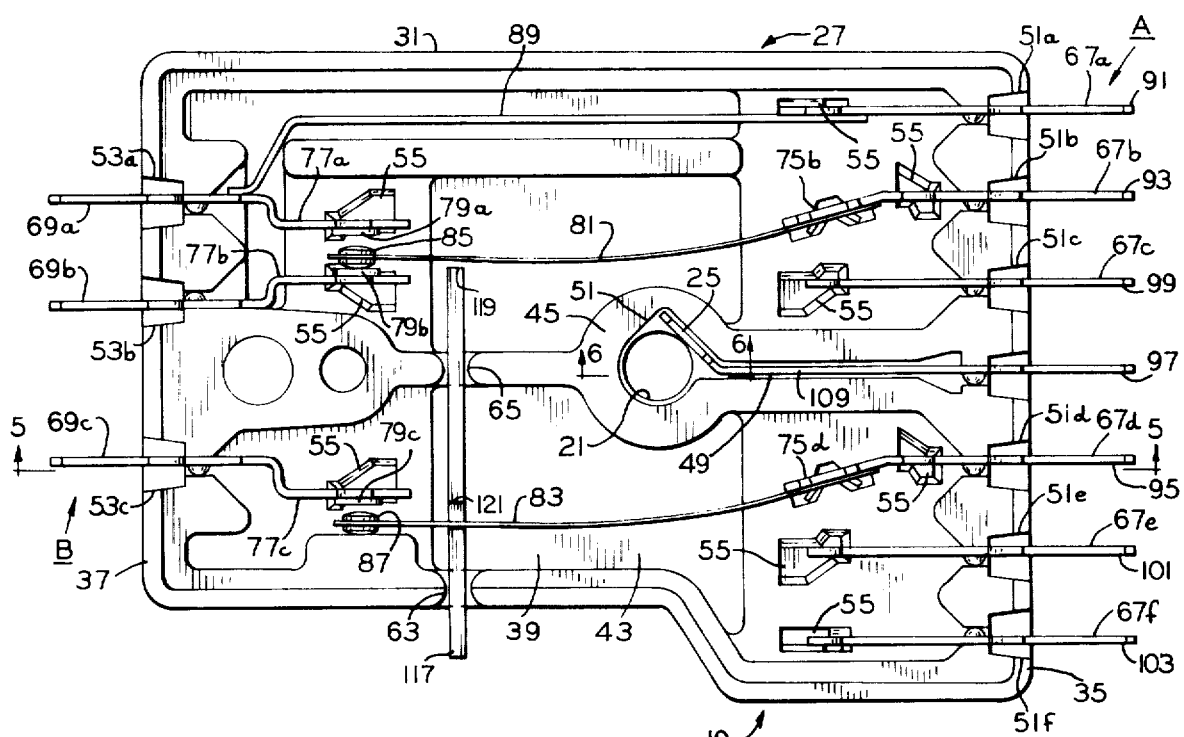
FIG. 2 is an enlarged plan view of the switch and terminal assembly of FIG. 1 with one of its casing members removed to show the internal components thereof.
Figures 4, 6, 7:
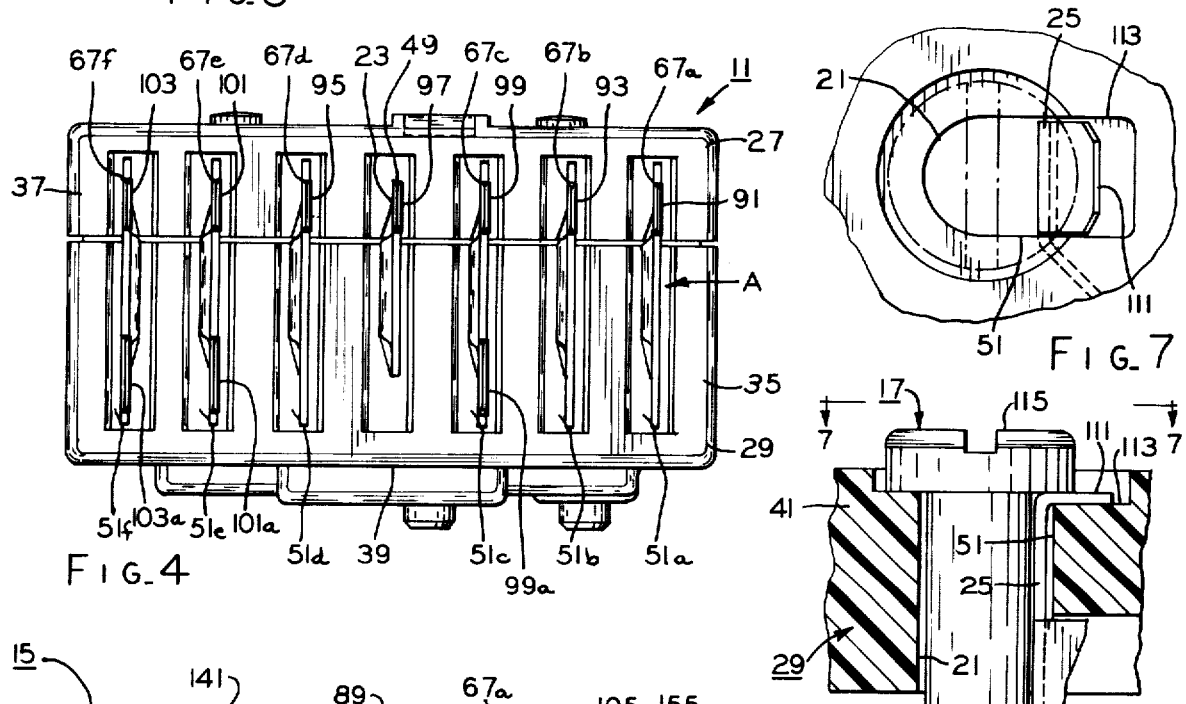
FIG. 4 is a right-side elevational view of the switch and terminal assembly of FIG. 2 with the casing members thereof secured together.
FIG. 6 is a partial sectional view taken generally along lines 6—6 of FIG. 2.
FIG. 7 is a partial sectional view taken generally along lines 7—7 of FIG. 6.

Referring now to the drawings in general, there is shown in one form of the invention a switch and terminal assembly, indicated generally at 11, and adapted to be mounted to a structural component, such as a conductive end frame 13, of a dynamoelectric machine or electric motor 15 by an electrical conductive mounting member, such as a metal screw or other suitable mounting means 17 (FIG. 1). Assembly 11 has a casing 19, and receiving means, such as an opening 21 or the like, is provided in the casing for accommodating mounting member 17 (FIGS. 2, 6 and 7). A grounding device, such as a ground terminal 23 (FIG. 8), is disposed in casing 19 for connecting dynamoelectric machine 15 with ground (FIGS. 2 and 9), and the ground terminal includes means, such as an integral tab or portion 25, associated with the receiving means or opening 21 for engagement or ground connection with mounting member 17 upon the mounting thereby of assembly 11 to dynamoelectric machine structural component or end frame 13 (FIGS. 1 and 2).

Figure 3:
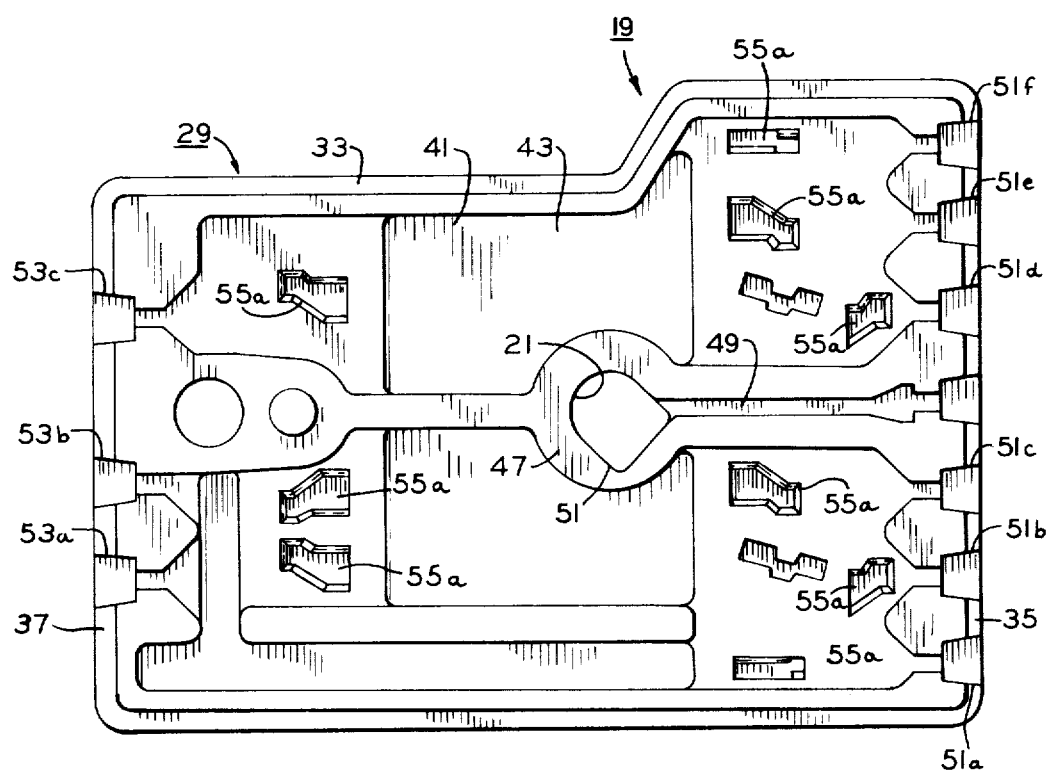
FIG. 3 is a plan view of the casing member removed in FIG. 2 showing the internal portion thereof.

More particularly and with specific reference to FIGS. 2–4, casing 19 of assembly 11 generally comprises a pair of separable casing or body members 27, 29 which are adapted to be releasably engaged or secured together. Casing members 27, 29 respectively include adjacent, generally mating peripheral wall means 31, 33 which, when mated together, respectively define at least a pair of opposite casing walls or end walls 35, 37. Another pair of opposite casing walls or sidewalls 39, 41 are integrally formed between peripheral wall means 31, 33 and a switch means accommodating chamber 43 is defined in casing 19 between the peripheral wall means and the sidewalls.

A pair of adjacent generally mating portions 45, 47 are also provided in casing 19 generally intermediate of chamber 43, and the mating portions are integrally formed with sidewalls 39, 41 and peripheral wall means 31, 33 respectively. When mated together, mating portions 45, 47 generally define opening or passage means 21 which extends completely through casing 19 intersecting with sidewalls 39, 41 and which includes a ground terminal receiving slot or aperture 49 also defined by the mating portions. One end of ground slot 49 intersects with end wall 35 and the other end thereof intersects with a recess 51 provided generally about opening generally 21 between the one end of the ground slot and casing sidewall 41. As previously noted, opening 21 is provided for accommodating mounting member 17, and ground slot 49 and recess 51 are provided to accommodate ground terminal 23, as discussed in detail hereinafter. It may be noted that mating portions 45, 47 generally isolate or separate opening 21, ground slot 49 and recess 51 from switch means accommodating chamber 43.

Figure 5:
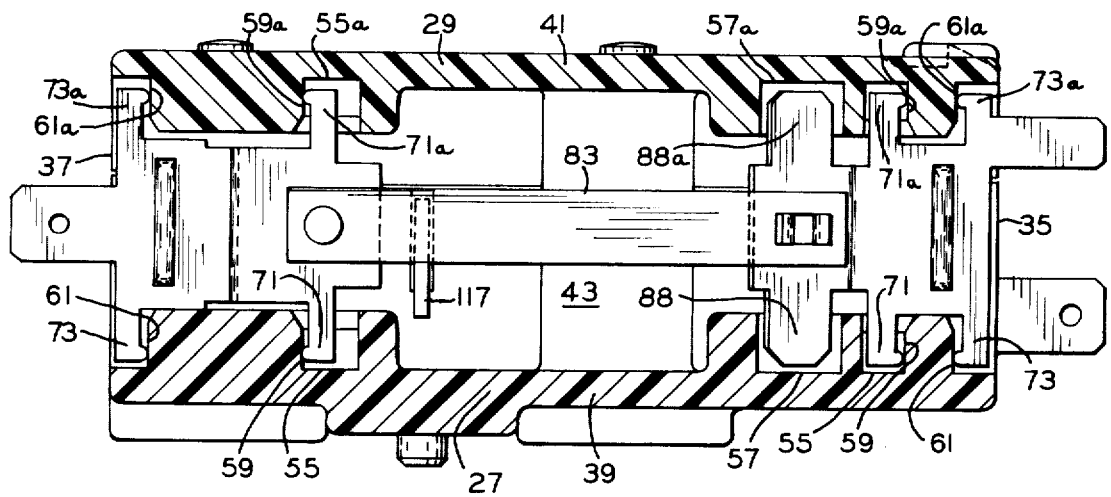
FIG. 5 is a sectional view taken generally along line 5—5 of FIG. 2.

Casing members 27, 29 are provided with a plurality of mating recesses which define slots or grooves 51a – 51f and slots or grooves 53a – 53c of generally oblong configurations extending through opposite end walls 35, 37 of casing 19 so that the interior end portions of the slots open into chamber 43. Slots 51a – 51f and slots 53a – 53c are disposed or arranged generally in spaced apart, row or tier formation longitudinally or vertically with respect to each other, and ground slot 49 is also arranged in the row or tier formation with slots 51a – 51f; however, the ground slot is generally isolated from casing chamber 43, as previously mentioned. Within chamber 43 and adjacent each interior end portion of slots 51b – 51f and slots 53a – 53c, a plurality of mating or aligned pairs of notches 55, 55a are molded or otherwise disposed in sidewalls 39, 41 of casing members 27, 29 for positioning engagement or association with a terminal of assembly 11, as discussed hereinafter. In association with each of slots 51a – 51f and slots 53a – 53c there is provided spaced pairs of oppositely facing seating, positioning or mounting surfaces 59, 61 and 59a, 61a on casing members 27, 29 (as best seen in FIG. 5) adapted to be gripped by the terminals of assembly 11, as also discussed hereinafter. Seating surfaces 59, 59a are provided within the mating notches 55, 55a of casing sidewalls 39, 41, and surfaces 61, 61a are provided at least adjacent casing end walls 35, 37. Another plurality of mating or aligned pairs of grooves, as indicated at 57, 57a are also molded or otherwise provided in sidewalls 39, 41 of casing members 27, 29 for stability purposes with respect to those terminals which carry switch blades, as discussed hereinafter. To complete the description of casing 19, a pair of pushbutton receiving guides or recesses 63, 65 are generally transversely provided through peripheral wall means 31 and mating portion 45 of casing member 29, and the pushbutton receiving guides extend generally normally with respect to slots 49, 51a – 51f and slots 53a – 53c.

The particular shapes of slots 49, 51a – 51f and 53a – 53c, notches 55, 55a, seating surfaces 59, 61 and 59a, 61a, grooves 57, 57a and the arrangements thereof with respect to each other are illustrated herein only for purposes of disclosure, and it is contemplated that other shapes and arrangements of these components may be provided within the scope of the invention so as to generally conform with the objects and advantageous features thereof.

As shown in FIG. 2, two stacks or pluralities A and B of terminals 67a – 67f and 69a – 69c are provided in assembly 11 extending through slots 51a – 51f and 53a – 53c provided therefor in casing end walls 35, 37, respectively, and ground terminal 23 which extends through ground slot 49 is included in terminal plurality A. It may be noted that terminals 67a – 67f and 69a – 69c and casing members 27, 29 include means, as discussed below, which have a tendency for securing the casing members together and for mounting the terminals. For instance, each of terminals 67a – 67f, 69a – 69c are provided with opposite pairs of spaced apart abutment surfaces, such as fingers 71, 73 and 71a, 73a or the like, which are disposed in releasable gripping, frictional or displacement preventing engagement with opposite pairs of seating surfaces 59, 61 and 59a, 61a provided therefor in each of slots 51a – 51f, 53a – 53c of casing members 27, 29 (as best seen in FIG. 5). In this manner, terminals 67a – 67f and 69a – 69c not only secure casing members 27, 29 together but also are mounted so as to be generally maintained against displacement from slots 51a – 51f, 53a – 53c. Of course, while the gripping engagement of fingers 71, 73 and 71a, 73a of terminals 67a – 67f and 69a – 69c with seating faces 59, 61 and 59a, 61a of slots 51a – 51f and 53a – 53c is described and shown herein as having the tendency to maintain the terminals generally against displacement from the slots and to secure casing members 27, 29 together, it is contemplated that other means for securing the casing members together and for mounting the terminals may be provided within the scope of the invention so as to generally conform with the objects and advantageous features thereof. Of course, it is also contemplated that the casing members and terminals may be assembled together without the interaction or securing engagement therebetween, as illustrated hereinabove for purposes of disclosure, so that the casing members may be generally loosely associated with each other, i.e. releasably engaged with each other, within the scope of the invention so as to be commensurate with the objects and advantageous features thereof. Further, if a more detailed description of the terminals, casing members and the releasable engagement effected therebetween is desired reference may be had to U.S. Pat. No. 3,313,905 issued to W. S. Zagorski on Apr. 11, 1967 which is specifically incorporated herein by reference.

Terminals 67b and 67d of terminal plurality A and terminals 69a – 69c of terminal plurality B respectively, include switch means supporting sections 75b, 75d and 77a – 77c interiorly of casing chamber 43, as shown in FIG. 2. A plurality of fixed contacts 79a – 79c are mounted in electrical conductive relation by suitable means well known in the art to switch means supporting sections 77a – 77c of terminals 69a – 69c, and fixed contacts 79a, 79b are disposed in facing relation with each other. A pair of movable contact elements or switch blades 81, 83 have one of their opposite ends fixedly mounted in electrical conductive relation by suitable means well known in the art to switch means supporting sections 75b, 75d of terminals 67b, 67d. While switch blade 81 is disclosed as a "slow-acting" blade, it is contemplated that a "snap-acting" blade, as is well known to the art, may also be utilized within the scope of the invention so as to generally conform with the objects and advantageous features thereof. A movable or double contact 85 is carried on the other end of switch blade 81 for selective electrical or circuit making and breaking engagement with opposed fixed contacts 79a, 79b, and another movable contact 87 is carried on the other end of switch blade 83 for selective electrical or circuit making and breaking engagement with fixed contact 79c. It may be noted that terminals 67b, 67d which carry switch blades 81, 83 are each provided with an oppositely extending pair of arms 88, 88a which are respectively disposed within grooves 57, 57a molded in sidewalls 39, 41 of casing members 27, 29 so as to provide a degree of stability therebetween when the casing members are assembled together and also permit the desired degree of deflection or bending of switch blades 81, 83. Terminal 67a has its interior end within chamber 43 of casing 19 connected in circuit relation by a buss or other electrical connector 89 with switch means supporting section 77a of terminal 69a, and terminals 67c, 67e and 67f of terminal plurality A may be dummy terminals, if desired, to provide additional connections for assembly 11.

In terminal plurality A, terminals 67a, 67b and 67d are each provided with a similarly shaped, single electrical connector section or male extension 91, 93, 95 which extend exteriorly of end wall 35 of casing 19, and ground terminal 23 is also provided with a single electrical connector section or male extension 97 having a shape generally similar to the electrical connector sections 91, 93, 95 and also extending exteriorly of end wall 35. Dummy terminals 67c, 67e, 67f are each provided with dual or pairs of dissimilar electrical connector sections or male extensions 99, 99a, 101, 101a, 103, 103a extending exteriorly of end wall 35 and arranged generally in side-by-side relation. It may be noted that male extensions 99, 101, 103 of dummy terminals 67c, 67e, 67f have a shape generally similar to male extensions 91, 93, 95, 97 of terminals 67a, 67b, 67d and ground terminal 23, and it may also be noted that the similarly shaped male extensions 91-103 are arranged in spaced relation and generally in row or tier formation, i.e., generally in vertical or longitudinal alignment, with each other adjacent or exteriorly of end wall 35 of casing 19. Of course, the other or dissimilarly shaped extensions 99a, 101a, 103a of dummy terminals 67c, 67e, 67f may also be disposed in vertical or row formation if desired. In this manner, the provision of the similarly shaped male extensions 91-103 in alignment or row formation facilitates the manual electrical connection therewith of a multiple connection assembly 105, as illustrated schematically in FIG. 9, having a plurality of female receptacles therein into which male extensions 91-103 may be fitted or received in circuit relation; therefore, a plurality of electrical connections or circuits may be concurrently made with or through assembly 11 by the engagement of multiple connection assembly 105 with the similarly shaped male extensions 91-103 of terminals 67a-67f of terminal plurality A. While dummy terminals 67c, 67e, 67f are shown and described hereinabove as extending through casing end wall 35, it is contemplated that such dummy terminals may either be omitted from assembly 11 or else disposed in another wall of casing 19 defined by the mating peripheral wall means 31, 33 of casing members 27, 29 so as to generally conform with the objects and advantageous features of the invention at least in one form thereof. In the event dummy terminals 67c, 67e, 67f are omitted from assembly 11 or else disposed in another wall thereof, as suggested above, then it may be noted that only the similarly shaped, single electrical connector sections 91-97 of terminals 67a, 67b, 67d and ground terminal 23 would extend exteriorly of casing end wall 35 generally in aligned or row formation so as to receive multiple connector assembly 105. Further, while seven terminals and three terminals are disclosed and described as generally comprising terminal plurality A and terminal plurality B, respectively it is contemplated that a greater or a lesser number of such terminals may be employed in each of the terminal pluralities according to the connection requirements for any given switch and terminal assembly, such as assembly 11.

Figure 8:
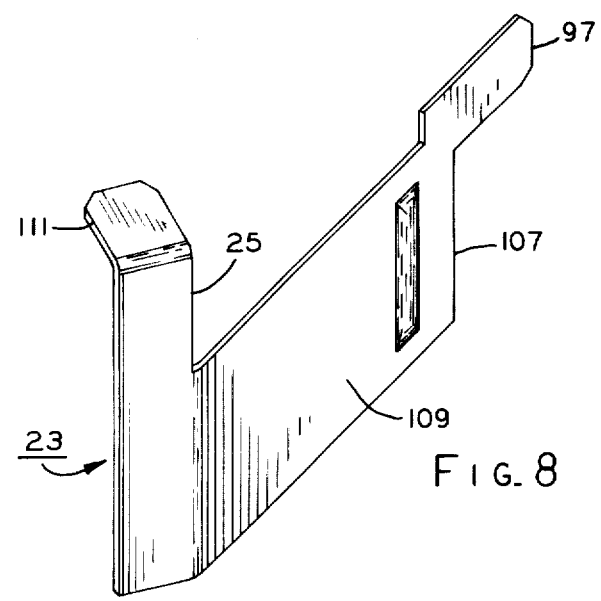
FIG. 8 is an isometric view of a ground terminal utilized in the switch and terminal assembly.

Referring now to FIGS. 2 and 6–8, grounding device or ground terminal 23 is provided with a body 107 preferably formed of any suitable electrical conductive metal having at least some resilient characteristics. Body 107 has a generally flat, elongate, intermediate part 109 which is disposed or mounted in slot 49 defined by mating portions 45, 47 of casing members 27, 29. Single electrical connector section 97 of ground terminal 23 is integrally formed with intermediate part 109 adjacent its rightward end so as to extend exteriorly of casing end wall 35. Tab 25 is integrally formed with intermediate part 109 of ground terminal body 107 adjacent its leftward end (as best seen in FIGS. 2 and 8), and the tab extends generally perpendicularly from the intermediate portion being disposed in recess 51 generally adjacent opening 21 defined by mating portions 45, 47 of casing members 27, 29. A distal or free end 111 of tab 25 (as best seen in FIGS. 7 and 8) is bent from the plane thereof and terminates adjacent an exterior recess 113 provided in sidewall 41 of casing member 29 so as to intersect with opening 21 therein. Distal end 111 of tab 25 is adapted to be mechanically engaged and connected in ground circuit relation with a head or abutment portion 115 of mounting member or screw 17 when thhe screw is assembled through opening 21 of casing 19 into threaded or mounting engagement with end frame 13 of dynamoelectric machine 15 for mounting assembly 11 thereto and for coupling the end frame in ground circuit relation with ground terminal 23 (as best seen in FIGS. 1 and 6). It may be noted that distal end 111 of tab 25 is adapted to be deformed generally toward exterior recess 113 of casing member 29 by head 115 of screw 17 when assembly 11 is so mounted to dynamoelectric machine 15, and the inherent resiliency of the metal from which ground terminal 23 is formed is contemplated to maintain the grounding connection between screw head 115 and distal end 111 of tab 25 upon the deformation thereof.

As shown in FIG. 2, a generally flat elongate pushbutton 117 is reciprocally mounted in guides 63, 65 provided therefore in casing member 27, and an upper or free end 119 of the pushbutton is juxtaposed with switch blade 81 for operating engagement therewith to effect the making and breaking of movable contact 85 with opposed fixed contacts 79a, 79b upon the operating reciprocal movement of the pushbutton. To complete the description of assembly 11, switch blade 83 passes through a slot 121 provided in pushbutton 117, and the upper end portion of the pushbutton slot is engagable with the switch blade to prevent the displacement of the pushbutton from casing 19 while the lower end portion of the pushbutton slot is operatively engagable with the switch blade to effect the making and breaking of movable contact 87 with fixed contact 79c upon the operating reciprocal movement of the pushbutton.

Figure 9:
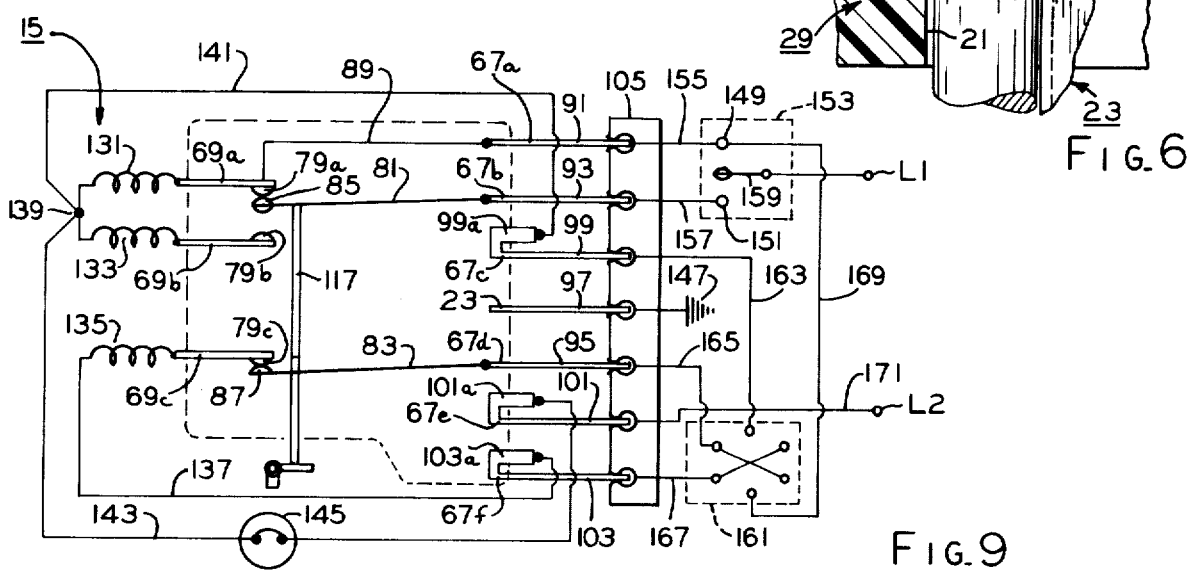
FIG. 9 is an exemplary schematic wiring diagram of the dynamoelectric machine and the switch and terminal assembly illustrating schematically a multiple connection means carrying a plurality of leads and adapted to be received by at least some of the terminals of the switch and terminal assembly in one form of the invention.

Referring again to the drawings in general and recapitulating, at least in part, with respect to the foregoing, a method is provided in one form of the invention for assembling switch and terminal assembly 11 and mounting it to dynamoelectric machine 15, the assembly being adapted for operation generally to control at least the energization of winding circuitry, as discussed in detail hereinafter, of the dynamoelectric machine (FIGS. 1 and 9). This assembly and mounting method includes at least the steps of: providing in assembly 11 the grounding device or ground terminal 23 adapted for connecting dynamoelectric machine 15 to ground (FIGS. 2 and 6); and securing the assembly to an electrical conductive component, such as end frame 13 of the dynamoelectric machine with mounting member 17 and coupling it in ground circuit relation with the ground terminal (FIGS. 1, 6 and 7).

More particularly, casing member 27 is positioned generally as shown in FIG. 2, and pushbutton 117 is placed in pushbutton receiving guides 63, 65 of the casing member. Terminals 67a – 67f and 69a – 69c are inserted or assembled into the respective slots 51a – 51f and 51a – 51c provided therefor in casing member 27 so that the respective similar electrical connector sections 91-103 are aligned generally in row formation exteriorly of casing wall 35, and upon such assembly of the terminals into their respective slots, abutment surfaces or fingers 71, 73 of each of the terminals are entered into gripping or frictional engagement with the cooperating opposite seating surfaces 59, 61 in each of such slots in the casing member. Of course, when terminals 67b, 67d are so mounted to casing member 27, their respective arms 88 are also disposed in the cooperating grooves 57 provided therefor in sidewall 39 of the casing member, and switch blades 81, 83 carried by these two terminals are disposed so that movable contacts 85, 87 thereof are respectively made with and broken from fixed contacts 79b, 79c of terminals 69b, 69c. Switch blade 83 is also placed into groove 121 of pushbutton 117.

Ground terminal 23 is also placed in that portion of slot 49 defined by mating portion 45 of casing member 27 with tab 25 of the ground terminal positioned, at least in part, in recess 51 of the casing member adjacent opening 21 therethrough. Of course, ground terminal 23 may be assembled with casing member 27 before, after or concurrently with the assembly thereto of terminals 67a – 67f and 69a – 69c, and pushbutton 117 may be assembled with the casing member either prior to or after the assembly of terminals 67b, 67d with the casing member. Thereafter, peripheral wall means 31, 33 and mating portions 45, 47 of casing member 27, 29 may be fitted or assembled together generally in alignment so as to enclose chamber 43. When casing members are so mated, abutment surfaces or fingers 71a, 73a of each terminal 67a – 67f and 69a – 69c are positioned in gripping engagement with opposite seating surfaces 59a, 61a provided in each portion of slots 51a – 51f and 53a – 53c in casing member 29, and arms 88a of terminals 69b, 69d are received in the cooperating grooves 57a provided therefor in sidewall 41 of casing member 29. As previously mentioned, the gripping or frictional engagement of terminal fingers 71, 73 and 71a, 73a with their cooperating seating surface 59, 61 and 59a, 61a tend to secure casing members 27, 29 together as well as mount terminal 67a – 67f and 69a – 69c therein. Of course, the alignment or mating of mating portions 45, 47 of casing members 27, 29 generally isolates ground slot 49, recess 51 and opening 21 from chamber 43, as previously mentioned, so that ground terminal 23 is electrically isolated from any of the electrically hot or current carrying components within the chamber.

With the component parts of assembly 11 so assembled as described above, it may then be mounted to dynamoelectric machine 15. To effect such mounting, assembly 11 may be disposed in its desired position on end frame 13 of dynamoelectric machine 15, as shown in FIG. 1, and the thread shank of mounting screw 17 is inserted through opening 21 in assembly 11 into threaded engagement with the end frame. Of course, in the alternative, mounting screw 17 may be inserted through opening 21 prior to the disposition of assembly 11 on dynamoelectric machine end frame 13. Upon the establishment of the threaded engagement between mounting screw 17 and dynamoelectric machine end frame 13, head 115 of the mounting screw is advanced into mechanical engagement or abutment with distal end 111 of tab 25 of ground terminal 23 so as to deform the ground terminal distal end toward exterior recess 113 in sidewall 41 of casing member 29, as shown in FIG. 6. In this manner, it may be noted that the threaded engagement of mounting screw 17 with dynamoelectric machine end frame 13 is effective to mount assembly 11 to dynamoelectric machine 15, and the mechanical engagement of mounting screw head 115 with the distal end 111 of tab 25 of ground terminal 23 also automatically completes a ground circuit from the dynamoelectric machine end frame 13, through mounting screw 17 and the ground terminal to the electrical connector section 97 thereof which is adapted for connection electrically to ground.

FIG. 9 shows switch and terminal assembly 11 utilized as a switch and electrical circuit making unit in circuit controlling relation with the windings of dynamoelectric machine 15 which is shown for example as a single phase multi-speed induction motor. In this illustrated exemplification, dynamoelectric machine 15 has two run or main field windings 131, 133 (e.g., four pole and six pole windings) selectively energized to provide two different speeds of operation and a start or auxiliary winding 135 connectable in parallel with run winding 133 during starting conditions. These windings may be arranged on a stationary assembly 134 of dynamoelectric machine 15 (as best seen in FIG. 1) and interconnected in any suitable manner well known to the art. Run windings 131, 133 and start winding 135 are respectively connected with terminals 69a, 69b and 69c and the start winding is also connected in series circuit relation with electrical connector section 103a of dummy terminal 67f by a lead 137. A connection point 139 is provided between run windings 131, 133, and a pair of leads 141, 143 are respectively connected between connection point 139 and electrical connector sections 99a, 101a of dummy terminals 67c, 67e. A standard thermal protector device 145 may be interposed in lead 143 if desired. The above-discussed connections of the windings to the various terminals may be made by the use of quick disconnects, if desired, as is well known to the art.

As previously mentioned, multiple connection assembly 105 is provided with a plurality of female receptacles which are removably and electrically coupled with electrical connector sections 91-103 of terminals 67a – 67f, respectively, and of course, ground terminal 23 is connected to a ground at 147 through the multiple connection assembly. Multiple connection assembly 105 connects electrical connector sections 91, 93 of terminals 67a, 67b with terminal posts 149, 151 of a single pole double throw speed selector switch 153 through leads 155, 157. Speed selector switch 153 has a movable arm 159 for circuit making engagement with its cooperating posts 149, 151, and the arm is connected in circuit relation with a line terminal L1. A double pole double throw reversing switch of a type well known to the art is illustrated schematically at 161 for controlling the direction of current through start winding 135 and, consequently, the direction of rotation of motor 15. Multiple connection assembly 105 respectively connects electrical connector sections 99, 95, 103 of dummy terminals 67c, 67d, 67f to reversing switch 157 through leads 163, 165, 167. Another lead 169 is connected between reversing switch 161 and terminal post 149 of speed selector switch 153. To complete the description of the exemplary circuit of FIG. 9, multiple connector assembly 105 also connects electrical connector section 101 of dummy terminal 67e to a line terminal L2 through another lead 171.

Referring now to FIG. 1, dynamoelectric machine 15 is provided with a rotatable assembly 173 which is rotatably mounted within stationary assembly 134 and driven in response to the energization of windings 131, 133, 135 of the dynamoelectric machine, as is well known in the art. A centrifugal switch device 175 also of a type well known to the art is conjointly rotatable with rotatable assembly 173 and axially movable relative thereto between a start or stand still position and an axially advanced or run position. A lever 177 is pivotally mounted to end frame 13 having one end driven by centrifugal switch device 175 and the other end disposed in driving or operating engagement with the exterior end of pushbutton 117 of assembly 11. When dynamoelectric machine 15 is de-energized, centrifugal switch device 175 is in its stand still position pivoting lever 177 so as to exert a force on pushbutton 117 of assembly 11 urging switch blades 81, 83 upwardly to engage contacts 85, 87 thereof with fixed contacts 79a, 79c, as shown in FIG. 9. Of course, while the combination of centrifugal switch device 175 and lever 177 are disclosed as means for actuating assembly 11, it is contemplated that the assembly may be actuated by other means or by the centrifugal switch device itself within the scope of the invention so as to be commensurate with the objects thereof.

In order to effect operation of dynamoelectric machine 15 at its high speed and with reference to FIG. 9, arm 159 of speed selector switch 153 is engaged with its cooperating post 149 thereby to connect line terminal L1 with one side of four pole run winding 131 through lead 155, terminal 67a, buss 89 and terminal 69a. The other side of run winding 131 is also connected through winding connection point 139, lead 143, dummy terminal 67e and lead 171 to line terminal L2. At the same time, start winding 135 is also energized through reversing switch 161 which may be connected across line terminals L1, L2 to effect current flow through lead 165, terminal 67d, switch blade 83, terminal 79c, the start winding, lead 137, dummy terminal 67f and lead 167. In this manner, both run and start windings 131, 135 are energized to effect the starting operation of dynamoelectric machine 15, and as it comes up to speed, centrifugal switch mechanism 175 is actuated from its start position to its run position, as is well known in the art, allowing lever 177 to pivot so as to alleviate the force exerted thereby on pushbutton 117 of assembly 11, FIG. 1. When such force is removed from pushbutton 117, the resilient forces of switch blades 81, 83 move the pushbutton donwardly so as to make movable contact 85 on switch blade 81 with fixed contact 79b and to break movable contact 87 on switch blade 83 from fixed contact 79c. Of course, the breaking of contacts 79c, 87 interrupts the circuit across reversing switch 161 to start winding 135 thereby to take it off the line.

In order to effect the operation of dynamoelectric machine 15 at its low speed, arm 159 of speed selector switch 153 is engaged with its cooperating post 151 thereby to connect line terminal L1 with one side of run winding 131 through lead 157, terminal 67b, switch blade 81 and terminal 69a. The other side of run winding 131 is also connected through winding connection point 139, lead 143, dummy terminal 67e and lead 177 to line terminal L2. At the same time start winding 135 is also energized through reversing switch 161 which may be connected across line terminals L1, L2 from one side of run winding 131 through lead 89, terminal 67a, lead 155, and lead 169 and also from the other side of run winding 131 through winding connection point 139, lead 141, dummy terminal 67e and lead 163. Current flow from reversing switch 161 across start winding 135 is effected through the same circuitry as previously discussed hereinabove. In this manner, both run and start windings 131, 135 are again energized to effect the starting operation of dynamoelectric machine 15, and as it comes up to speed, centrifugal switch device 175, lever 177 and pushbutton 117 are operated in the same manner as previously described hereinabove. Again, the resilient force of switch blade 81 acts to break movable contact 85 from fixed contact 79a thereby to take run winding 131 off the line and to make movable contact 85 with fixed contact 79b thereby to place six pole run winding 133 across the line so that dynamoelectric machine will run at its slow speed. The resilient force of switch blade 83 acts to break movable contact 87 from fixed contact 79c thereby to interrupt the circuit across reversing switch 161 to start winding 135 so that it also is taken off the line. Farther, the breaking of movable contact 85 from fixed contact 79a acts to take the reversing switch off the line so long as run winding 133 remains energized to operate dynamoelectric machine 15 at its slower speed.

While assembly 11 is disclosed in conjunction with a single phase, multi-speed induction motor, it is to be understood that such assembly may also be employed with other types of motors, and it is also contemplated that such assembly may be utilized with or without multiple connection assembly 105 within the scope of the invention. Further, in some applications of assembly 11, the switch means portion thereof including switch blade 83 may be employed to control auxiliary circuits other than the winding circuitry of dynamoelectric machine 15, as is well known in the art without departing from the scope of the invention.

From the foregoing, it is now apparent that a novel switch and terminal assembly 11 and a novel method of assembling a switch and terminal assembly and mounting it to a dynamoelectric machine has been presented meeting the objects and advantageous features set out hereinbefore, as well as others. Further, it is contemplated that changes as to the precise arrangements, shapes, details and connections of the components of such novel switch and terminal assembly as well as in the steps of such novel assembling and mounting method may be made by those having ordinary skill in the art without departing from the spirit of the invention or the scope thereof, as set out in the claims which follow.

What we claim as new and desire to secure by Letters Patent of the U.S. is:

1. A switch and terminal assembly adapted to be mounted to a structural component of a dynamoelectric machine by an electrical conductive mounting member comprising:
   a. a casing;
   b. receiving means in said casing for accommodating the mounting member; and
   c. a grounding device disposed in said casing for connecting the dynamoelectric machine with a ground including means associated with said receiving means for grounding engagement with the mounting member upon the mounting thereby of the switch and terminal assembly to the dynamoelectric machine structural component, and means exposed exteriorly of said casing for connection with the ground.

2. A switch and terminal assembly as set forth in claim 1 wherein said casing includes a switch means accommodating chamber, and said receiving means extending through said chamber and being isolated therefrom.

3. A switch and terminal assembly as set forth in claim 1 wherein said casing includes a switch means accommodating chamber, and means defining said receiving means for isolating the mounting means and said grounding device from said chamber.

4. A switch and terminal assembly as set forth in claim 1 wherein said grounding engagement means includes a tab disposed at least in part in said receiving means, and a portion on said tab adapted to be deformed upon the engagement therewith of the mounting member when the assembly is mounted thereby to the dynamoelectric machine structural component.

5. A switch and terminal assembly as set forth in claim 1 wherein said grounding engagement means includes means adapted for deformation upon the engagement therewith of the mounting means.

6. A switch and terminal assembly as set forth in claim 5 wherein said casing includes wall means through which said receiving means extends, recess means in said wall means generally about said receiving means, and said deformation means being disposed at least in part in said recess means upon the deforming of said deformation means by the mounting means.

7. A switch and terminal assembly as set forth in claim 2 further comprising switch means disposed in said chamber and operable generally for interrupting and completing a circuit through said casing.

8. A switch and terminal assembly as set forth in claim 7 further comprising means movable in said casing in response to an applied force thereon for effecting the operation of said switch means.

9. A switch and terminal assembly as set forth in claim 1 wherein said casing includes wall means comprising at least a pair of opposite walls, said connection means extending through one of said opposite walls.

10. A switch and terminal assembly as set forth in claim 9 further comprising at least a pair of terminals extending through said opposite walls, respectively, and a pair of switch elements adapted for engagement with each other respectively supported by said terminals interiorly of said casing.

11. A switch and terminal assembly as set forth in claim 9 further comprising at least one dummy terminal associated with said wall means so as to be mounted to said casing and having a pair of electrical connector sections exposed exteriorly of said casing.

12. A switch and terminal assembly as set forth in claim 1 further comprising at least one dummy terminal mounted to said casing.

13. A switch and terminal assembly as set forth in claim 1 further comprising at least one terminal mounted to said casing and having a pair of electrical connector sections disposed generally in side-by-side relation with each other exteriorly of said casing with one of said electrical connector sections being disposed generally in row formation with said connection means.

14. A switch and terminal assembly as set forth in claim 13 wherein said connection means comprises only a single ground connector section exteriorly of said casing having a shape generally similar to that of said one electrical connector section.

15. A switch and terminal assembly as set forth in claim 14, wherein the other of said electrical connector sections of said at least one terminal has a shape dissimilar to that of said one electrical connector section.

16. A switch and terminal assembly adapted to be mounted to a structural component of a dynamoelectric machine by an electrical conductive mounting member comprising:
   a. a casing having a switch means accommodating chamber therein;
   b. an opening in said casing extending therethrough and generally isolated from said chamber for accommodating the mounting member; and
   c. a ground terminal disposed in said casing including a ground connection section extending exteriorly of said casing for connection in circuit relation to a ground, and a portion disposed in said opening and having a deformable end arranged with said opening for grounding engagement in the ground circuit relation with the mounting member, said end being engaged and urged toward a deformed position by the mounting member upon the disposition thereof through said opening into mounting engagement with the dynamoelectric machine structural component so as to mount the switch and terminal assembly thereto and couple the dynamoelectric machine structural component in the ground circuit relation with said ground terminal.

17. A switch and terminal assembly adapted to be mounted to a structural component of a dynamoelectric machine by an electrical conductive mounting member, the assembly comprising: a casing having at least a pair of opposed end walls with a pair of opposed sidewalls interconnected therebetween; a chamber in said casing between said end walls and said sidewalls; an opening in said casing intersecting said sidewalls and generally isolated from said chamber so as to accommodate the mounting member; a slot in said casing disposed between said sidewalls so as to intersect with said opening and one of said end walls and generally isolated from said chamber; a ground terminal mounted in said opening and said slot including a ground connector section extending from said slot through said one end wall exteriorly of said casing for connection in ground circuit relation to a ground, and a deformable portion disposed at least in part in said opening for connection in the ground circuit relation with the mounting member when it is disposed within said opening and coupled with the structural component so as to mount the assembly thereto and connect the structural component in the ground circuit relation with said ground terminal; at least one terminal extending through one of said one end wall and the other of said end walls, said at least one terminal including an electrical connector section exteriorly of said casing, and a switch means supporting section within said chamber; at least another terminal extending through the other of said one end wall and said other end wall, said at least another terminal including another electrical connector section exteriorly of said casing, and another switch means supporting section within said chamber; a fixed contact mounted to one of said first named switch means supporting section and said another switch means supporting section; and a movable contact element mounted to the other of said first named switch means supporting section and said another switch means supporting section for selective engagement with said fixed contact.

18. A switch and terminal assembly adapted to be mounted to a structural component of a dynamoelectric machine by an electrical conductive mounting member comprising:
  a. a casing including receiving means extending therethrough for accommodating the mounting member, and slot means connected with said receiving means for passage through said casing so as to open exteriorly thereof;
  b. a switch means accommodating chamber within said casing and generally isolated from said receiving means and said slot means; and
  c. means disposed at least in part within said receiving means and adapted for grounding engagement with the mounting member upon the mounting thereby of the switch and terminal assembly to the dynamoelectric machine structural component and said grounding engagement means including means disposed in said slot means and extending exteriorly of said casing for connection with a ground.

19. A switch and terminal assembly adapted to be mounted to a structural component of a dynamoelectric machine by an electrical conductive mounting member, the assembly comprising a casing adapted to receive therethrough the mounting member, and means for coupling the dynamoelectric machine in ground circuit relation with a ground therefor including means disposed at least in part in said casing and adapted for grounding engagement in the ground circuit relation with the mounting member when it is received through said casing so as to mount the assembly to the dynamoelectric machine structural component, and means exposed with respect to an exterior part of said casing for connection in the ground circuit relation to the ground.

20. A switch and terminal assembly as set forth in claim 19 further including at least one terminal mounted to said exterior part of said casing generally adjacent said connection means and having a pair of electrical connector sections, and one of said electrical connector sections of said at least one terminal being aligned generally in row formation with said connection means.

21. A switch and terminal assembly as set forth in claim 20 wherein said electrical connection sections of said at least one terminal have dissimilar shapes, and said connection means comprising only a single ground connector section having a shape generally similar to that of said one electrical connector section.

22. A switch and terminal assembly as set forth in claim 19 further comprising switch means disposed within said casing, and said casing including means for isolating said switch means from said coupling means and from the mounting member when it is received through said casing so as to mount the assembly to the dynamoelectric machine structural component.

23. A switch and terminal assembly as set forth in claim 19 wherein said casing includes a pair of generally opposite walls, an opening through said casing between said walls so as to accommodate the mounting means when it is received through said casing, and said grounding engagement means being associated with said opening.

24. A switch and terminal assembly as set forth in claim 23 wherein said casing further includes another pair of generally opposite walls interconnected between said first named wall pair, respectively, one of said walls of said another wall pair comprising said exterior part of said casing, and means in said casing intersecting with said opening and said one wall of said another wall pair for accommodating said coupling means with said connection means extending from said slot means so as to be connected to the ground.

25. A switch and terminal assembly adapted to be mounted to a structural component of a dynamoelectric machine by an electrical conductive mounting member comprising:
  a. a ground terminal including means for grounding engagement in ground circuit relation with the mounting member, and means for connection in the ground circuit relation with a ground; and
  b. a casing having wall means, said wall means including at least a first pair of generally opposite walls interposed between a second pair of generally opposite walls, a switch means accommodating a chamber in said casing within said wall means, means in said casing and isolated from said chamber for accommodating both said ground terminal and the mounting member, said accommodating means including passage means intersecting said first wall pair and one of said walls of said second wall pair, said grounding engagement means and said connection means being respectively disposed at least in part in said passage means so that said ground terminal may be associated in the ground circuit relation with the mounting member upon the mounting thereby of the switch and terminal assembly to the dynamoelectric machine structural component, and said connection means including means extending from said passage means exteriorly of said one wall of said second wall pair for receiving in the ground circuit relation the ground.

26. A switch and terminal assembly adapted to be mounted to a structural component of a dynamoelectric machine by an electrical conductive member, the assembly comprising a plurality of separable casing members having wall means including first engaging portions forming a first casing wall in spaced apart and generally opposite relation to second engaging portions forming a second casing wall, and third and fourth generally opposite casing walls interposed between said first and second engaging portions, respectively; means in said casing members between said third and fourth casing walls for accommodating the mounting member; and a ground device mounted with said casing members including means arranged with said accommodating means so as to be disposed for grounding engagement with the mounting member upon the mounting thereby of the assembly to the dynamoelectric machine structural component, and means connected with said grounding engagement means and extending exteriorly of said casing members adjacent one of said first casing wall and said second casing wall for connection with a ground.

27. A switch and terminal assembly as set forth in claim 26 further comprising means in said casing members intersecting with said accommodating means and said one of said first casing wall and said second casing wall for the passage through said casing members of said connection means.

28. A switch and terminal assembly as set forth in claim 26 wherein said connection means includes a single ground connector section exteriorly of said casing member adjacent said one of said first casing wall and said second casing wall for the connection with the ground.

29. A switch and terminal assembly as set forth in claim 28 further comprising at least one terminal disposed in said one of said first casing wall and said second casing wall and including a pair of electrical connector sections exteriorly of said casing members generally adjacent said one of said first casing wall and said second casing wall, one of said electrical connector sections being aligned generally in row formation with said single ground connector section.

30. A switch and terminal assembly as set forth in claim 26 further comprising a dummy terminal mounted to said wall means and having a pair of electrical connector sections exposed exteriorly of said casing members.

31. A switch and terminal assembly as set forth in claim 26 further comprising a switch means and accommodating chamber within said casing members and isolated from said ground device.

32. A switch and terminal assembly as set forth in claim 31 further comprising a pair of terminals disposed in said first casing wall and said second casing wall and extending into said chamber, and a pair of switch means elements supported in said chamber on said terminals and disposed for switching engagement with each other.

33. A switch and terminal assembly as set forth in claim 32 wherein one of said terminals includes a pair of generally side-by-side electrical connector sections exteriorly of said casing members generally adjacent said one of said first casing wall and said second casing wall, one of said electrical connector sections being disposed generally in row formation with said single ground connector section.

34. A switch and terminal assembly adapted to be mounted to a structural component of a dynamoelectric machine by an electrical conductive mounting member, the assembly comprising a casing; a pair of oppositely disposed pluralities of terminals mounted to said casing, each of said terminal pluralities including two switch terminals respectively having a pair of dissimilarly shaped electrical connection sections disposed generally in side-by-side relation and in row formation exteriorly of said casing; receiving means in said casing for accommodating the mounting member; and a ground terminal arranged with said receiving means so as to be disposed for grounding engagement with the mounting member upon the mounting thereby of the assembly to the dynamoelectric machine structural component, said ground terminal including a single ground connector section extending exteriorly of said casing for connection with a ground with said single ground connector section having a shape generally similar to that of one of said electrical connector sections of said two switch terminals in one of said terminal pluralities and being disposed generally in the row formation with said one electrical connector section of said two switch terminals in said one terminal plurality.

35. A switch and terminal assembly as set forth in claim 34 further comprising a switch means accommodatng chamber in said casing.

36. A switch and terminal assembly as set forth in claim 35 wherein each of said two switch terminals of said terminal pluralities respectively include switch means supporting sections within said chamber.

37. A switch and terminal assembly as set forth in claim 36 further comprising a switch element respectively mounted to each switch means supporting section of said two switch terminals of said one terminal plurality and adapted for switching engagement with another switch element respectively mounted to each switch means supporting section of said two switch terminals of the other of said terminal pluralities.

38. A switch and terminal assembly as set forth in claim 34 wherein said ground terminal includes means adapted for deformation upon the grounding engagement therewith of the mounting member when the assembly is mounted to the dynamoelectric machine structural component.

39. A switch and terminal assembly as set forth in claim 34 wherein said casing includes means for isolating said ground terminal from switch means components interiorly of said casing.

40. A switch and terminal assembly adapted to be mounted to a structural component of a dynamoelectric machine by an electrical conductive mounting member, the assembly comprising a casing having wall means, said wall means including a first pair of generally opposite walls interposed between a second pair of generally opposite walls; a chamber in said casing within said wall means; a pair of pluralities of terminals disposed in said walls of said first wall pair, each of said terminal pluralities including at least one terminal having a pair of dissimilarly shaped electrical connection sections disposed generally in side-by-side relation exteriorly of said walls of said first wall pair, respectively; an opening in said casing intersecting said walls of said second wall pair and isolated from said chamber for accommodating the mounting member; a slot in said casing intersecting with said opening and one of said walls of said first wall pair and isolated from said chamber; and a ground device disposed at least in part in said opening and said slot for grounding engagement with the mounting member upon the mounting thereby of the assembly to the dynamoelectric machine structural component and having only a single electrical connection section extending exteriorly of said slot so as to be included in one of said terminal pluralities and adapted for connection with a ground, said single electrical connection section of said grounding device having a shape generally similar to one of said electrical connection sections of said at least one terminal in said one terminal plurality and being disposed generally in row formation therewith, and both of said at least one terminals of said terminal pluralities supporting within said chamber a switch element adapted for selective engagement with each other, respectively.

41. A switch and terminal assembly comprising a casing; a chamber in said casing; a plurality of terminals disposed in said casing, at least one terminal of said terminal plurality having a pair of dissimilarly shaped electrical connector sections disposed generally in side-by-side relation exteriorly of said casing; another terminal of said terminal plurality comprising a ground terminal having only a single ground connector section disposed exteriorly of said casing, said single ground connector section having a shape generally similar to that of one of said electrical connection sections of said at least one terminal and arranged generally in row formation with said one electrical connector section; and terminal means disposed in said casing generally in spaced relation with said at least one terminal, said at least one terminal and said terminal means being switch terminals having a pair of means within said chamber for supporting a pair of switch elements adapted for selective engagement with each other.

42. A switch and terminal assembly comprising a casing having wall means defining a chamber within said casing, a pair of pluralities of terminals disposed in said wall means, respectively, each of said terminal pluralities including a pair of terminals having a pair of dissimilarly shaped electrical connector sections disposed generally in side-by-side relation and generally in row formation exteriorly of said wall means, respectively, at least another terminal in one of said terminal pluralities having only a single electrical connector section exteriorly of said wall means with a shape generally similar to that of one of said electrical connector sections of said terminal pair of said one terminal plurality and arranged generally in the row formation therewith, and said terminal pair of said one terminal plurality supporting within said chamber a pair of switch elements adapted for selective engagement with another pair of switch elements supported in said chamber by said terminal pair of the other of said terminal pluralities, respectively.

* * * * *